United States Patent
Kesselmayer

(10) Patent No.: US 7,955,471 B2
(45) Date of Patent: Jun. 7, 2011

(54) MOISTURE-REACTIVE HOT-MELT ADHESIVE

(75) Inventor: Mark Alan Kesselmayer, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 260 days.

(21) Appl. No.: 10/843,889

(22) Filed: May 12, 2004

(65) Prior Publication Data

US 2004/0229048 A1    Nov. 18, 2004

Related U.S. Application Data

(60) Provisional application No. 60/469,988, filed on May 13, 2003.

(51) Int. Cl.
*B32B 37/00* (2006.01)

(52) U.S. Cl. .................. 156/331.4; 156/331.1

(58) Field of Classification Search .......... 156/305, 156/331.1, 331.4, 331.7; 525/123, 131
See application file for complete search history.

(56) References Cited

U.S. PATENT DOCUMENTS

| | | | |
|---|---|---|---|
| 4,889,915 A * | 12/1989 | Brauer et al. | 525/458 |
| 5,021,507 A | 6/1991 | Stanley | |
| 5,234,519 A * | 8/1993 | Talbot et al. | 156/212 |
| 5,252,155 A | 10/1993 | Nowicki | |
| 5,527,266 A * | 6/1996 | Hiraishi et al. | 602/8 |
| 5,747,627 A * | 5/1998 | Kimura et al. | 528/59 |
| 5,827,926 A | 10/1998 | Shimizu | |
| 5,908,700 A * | 6/1999 | Shimizu et al. | 428/423.1 |
| 6,274,674 B1 | 8/2001 | Chang et al. | |
| 6,303,731 B1 | 10/2001 | Carlson | |
| 6,365,700 B1 | 4/2002 | Graham | |
| 6,465,104 B1 | 10/2002 | Krebs | |
| 6,482,878 B1 | 11/2002 | Chu | |
| 6,613,836 B2 * | 9/2003 | Rumack | 524/589 |
| 2003/0010443 A1 | 1/2003 | Rumack | |
| 2005/0033004 A1 | 2/2005 | Hoffmann et al. | |

FOREIGN PATENT DOCUMENTS

| | | |
|---|---|---|
| EP | 1378531 A1 | 1/2004 |
| WO | WO 96/35734 | 11/1996 |

OTHER PUBLICATIONS

Lucite International Inc., Elvacite 2013 Acrylic Resin, Technical Data Sheet.

* cited by examiner

*Primary Examiner* — John L. Goff

(74) *Attorney, Agent, or Firm* — Carl P. Hemenway

(57) ABSTRACT

A moisture-reactive hot-melt adhesive composition, useful as an adhesive, is provided. The composition is particularly useful as an adhesive for bonding profile-wrap articles. Also provided are a method for making profile-wrap articles using the composition and the profile-wrap articles so made.

5 Claims, No Drawings

MOISTURE-REACTIVE HOT-MELT ADHESIVE

CROSS-REFERENCE TO RELATED APPLICATIONS

This is a Non-Provisional U.S. Patent Application of U.S. Provisional Patent Application No. 60/469,988, filed May 13, 2003.

BACKGROUND

This invention relates to profile-wrap articles in which the profile and the wrap are bonded using moisture-reactive hot-melt adhesive compositions; to moisture-reactive hot-melt adhesive compositions useful for making profile-wrap articles; and to a method of making such profile wrap articles.

Some moisture-reactive hot-melt polymer compositions are useful as reactive hot-melt adhesives for bonding profile-wrap articles. Desirable properties of such adhesives include high green strength, high ultimate strength, and short open time. Green strength is the bond strength prior to completion of the reaction with moisture; ultimate strength is the adhesive strength after the reaction with moisture is essentially complete; and open time is the period of time after the hot-melt adhesive is applied to one or more substrates, during which one or more subsequent substrates may be contacted with the adhesive, without significant loss of ultimate strength.

U.S. Pat. No. 6,303,731 describes a pressure-sensitive adhesive (PSA) and suggests that the PSA could be used in profile wrapping. By definition, PSA's are tacky and remain so indefinitely. Additionally, PSA's generally have relatively low ultimate strength when used to bond articles.

The problem therefore faced by the inventor is the provision of a moisture-reactive hot-melt adhesive composition that achieves a desirably short open time, usefully high green strength, and desirably high ultimate strength. The inventor has found that the desired properties can be achieved by the provision of a moisture-reactive hot-melt urethane composition that is not a pressure-sensitive adhesive and that incorporates at least one non-reactive acrylic polymer and that excludes effective amounts of reactive acrylic polymer. The inventor has further found that the moisture-reactive hot-melt urethane composition is useful for bonding profile-wrap articles.

STATEMENT OF THE INVENTION

In a first aspect of the present invention, there is provided a method for bonding substrates comprising the steps of
  (a) heating a moisture-reactive hot-melt adhesive composition formed by a process comprising admixing components comprising at least one polyol; at least one polyisocyanate; at least one non-reactive acrylic polymer having weight-average molecular weight of 40,000 or greater; 0.5% or less by weight reactive acrylic polymer, based on the weight of said hot-melt adhesive composition; and 5% or less by weight thermoplastic ethylene copolymer resins, based on the weight of said hot-melt adhesive composition;
  (b) contacting said heated hot-melt adhesive composition to at least one rigid lineal substrate and at least one flexible wrap substrate;
  (c) cooling, or allowing to cool, said heated hot-melt adhesive composition; and
  (d) reacting said hot-melt adhesive composition with water or allowing it to react with water;
wherein said hot-melt adhesive composition, after said step (d), is not a pressure-sensitive adhesive.

In a second aspect of the present invention, there is provided an article made by a method comprising the steps of
  (a) heating a moisture-reactive hot-melt adhesive composition formed by a process comprising admixing components comprising at least one polyol; at least one polyisocyanate; at least one non-reactive acrylic polymer having weight-average molecular weight of 40,000 or greater; 0.5% or less by weight reactive acrylic polymer, based on the weight of said hot-melt adhesive composition; and 5% or less by weight thermoplastic ethylene copolymer resins, based on the weight of said hot-melt adhesive composition;
  (b) contacting said heated hot-melt adhesive composition to at least one rigid lineal substrate and at least one flexible wrap substrate;
  (c) cooling, or allowing to cool, said hot-melt adhesive composition; and
  (d) reacting said hot-melt adhesive composition with water or allowing it to react with water;
wherein said hot-melt adhesive composition, after said step (d), is not a pressure-sensitive adhesive.

In a third aspect of the present invention, there is provided a moisture-reactive hot-melt adhesive composition formed by a process comprising admixing components comprising at least one polyol, at least one polyisocyanate, and at least one non-reactive acrylic polymer having weight-average molecular weight of 40,000 or greater; wherein said components comprise 0.5% or less by weight reactive acrylic polymer, based on the weight of said hot-melt adhesive composition; wherein said components comprise 5% or less by weight thermoplastic ethylene copolymer resins, based on the weight of said hot-melt adhesive composition; and wherein said hot-melt adhesive composition, after reacting with water, is not a pressure-sensitive adhesive.

DETAILED DESCRIPTION

"Acrylic polymers" as defined herein are polymers formed by the polymerization of at least one (meth)acrylic monomer or a mixture of monomers that includes at least one (meth) acrylic monomer. Herein, "(meth)acrylic" means "acrylic or methacrylic"; and "(meth)acrylate" means "acrylate or methacrylate." A polymer made by polymerization of a mixture of monomers is said to "incorporate" of each of those monomers. (Meth)acrylic monomers include, for example, (meth) acrylic acid, esters thereof, amides thereof, derivatives thereof, and mixtures thereof (Meth)acrylic monomers include, for example, alkyl(meth)acrylate esters, aryl(meth) acrylate esters, alkaryl(meth)acrylate esters, halogenated alkyl, aryl, and alkaryl(meth)acrylate esters, other (meth) acrylate esters, N-substituted (meth)acrylamides, derivatives thereof, and mixtures thereof. Some (meth)acrylic monomers are, for example, alkyl (meth)acrylate esters wherein the alkyl group consists of a linear, branched or cyclic alkyl group with 1 to 70 carbon atoms. Acrylic polymers sometimes also incorporate one or more monomers other than (meth)acrylic monomers such as, for example, styrene, substituted styrene, vinyl acetate, diene monomers such as butadiene, or ethylene. Generally, acrylic polymers incorporate 50% or more by weight (meth)acrylic monomers, based on the weight of the acrylic polymer.

Profile wrapping is a process whereby one or more flexible wraps is bonded to a rigid lineal article. A lineal article is one that is relatively long in one dimension compared to the other two dimensions; in most cases, the shape of the cross section is relatively uniform. In some cases, the shape of the cross section includes at least one corner and more than one face. Faces on the shape of the cross section may be flat or curved. The shape of the cross section may have flat portions, convex portions, concave portions, or a combination thereof.

Rigid lineal articles, sometimes also called moldings, possess sufficient rigidity that a short length can support its own weight. For example, when a sample of a rigid lineal article is cut to a length of 6 cm, is held horizontally, and is supported by two supports that are 5 cm apart, the center point of such a sample will show vertical deflection from the horizontal of less than 5 mm. Rigid lineal articles are made of materials such as, for example, wood, fiberboard, particle board, other wood composites, metal, or plastic. Plastics used for making rigid lineal articles include, for example, polyvinyl chloride (PVC). Common rigid lineal articles include, for example, wooden moldings and plastic articles made by profile extrusion.

Flexible wraps include, for example, fabrics, films, foils, and combinations thereof. Flexible wraps possess sufficient flexibility that they may be readily bent so as to conform to the shape of a rigid lineal article. Flexible wraps are normally thin, flat articles; they are normally made to be thin enough to have the desired flexibility. Flexible wraps may be made from a wide variety of materials, including, for example, paper, plastic (such as, for example, PVC, acrylic polymers, and other polymers), fabric, metal, wood, or combinations thereof, including mixtures, laminates, and other combinations. Some articles suitable as flexible wraps are known by the terms "film" and/or "foil." These terms describe the thin, flexible nature of the article, and these terms apply to such articles, regardless of the composition of the article. For example, two common suitable flexible wraps are PVC foil and acrylic polymer foil. Some suitable foils are also known as decorative foils.

Some flexible wraps are articles that are flat or nearly flat when not subjected to mechanical forces. Among such articles, there are some that, after being desirably bent to conform to the shape of a rigid lineal article, have a mechanical elasticity that creates a force that tends to return the article to its flat state. When it is desired to bond such flexible wraps to rigid lineal articles, it is desirable to use an adhesive that forms a strong bond relatively quickly, so that it is not necessary to apply mechanical force to hold the flexible wrap in place for a long time while waiting for the adhesive to form a strong bond. Also, it is desirable that the ultimate strength of the adhesive is strong enough to permanently overcome the mechanical elasticity of the flexible wrap, so that the flexible wrap stays bonded to the rigid lineal article and does not detach itself from the rigid lineal article due to the tendency of the profile wrap to return to the flat state.

An example of a product made by a profile wrap process is a window frame covered with a decorative foil. To make a window frame by a profile wrap process, at least one lineal component of the window frame (for example, the sides, the top, the bottom, etc.) is combined with a flexible wrap in a profile wrap process; the lineal components, plus optional further components, are then appropriately cut and fastened together to make the window frame.

The composition of this invention is a moisture-reactive hot-melt composition useful as an adhesive. By "moisture-reactive" is meant herein that the composition contains isocyanate groups which are capable of reacting with water desirably to effect an increase in the molecular weight of the composition and/or effect crosslinking of the composition so as to increase the strength properties of the composition subsequent to being contacted with water. By "hot-melt" is meant herein that the composition which may be a solid, semi-solid, or viscous mass can be advantageously heated to provide a fluid adhesive of a viscosity suitable for application to and adhesion to substrates.

In some embodiments, the moisture-reactive hot-melt adhesive composition of the present invention undergoes, in addition to reacting with water, additional chemical reactions that also desirably effect an increase in the molecular weight of the composition and/or effect crosslinking of the composition so as to improve the properties of the composition.

The moisture-reactive hot-melt adhesive composition of the present invention is said to "cure" as any of the chemical reactions that desirably effect an increase in the molecular weight of the composition and/or effect crosslinking of the composition so as to improve the properties of the composition take place. Such chemical reactions are known as "curing reactions." The composition is said to be "cured" when such reactions are complete or when the composition has been in conditions that allow curing reactions to take place and the curing reactions have progressed sufficiently far that the properties of the composition are not appreciably changing over time.

The moisture-reactive hot-melt adhesive composition of the present invention is formed by a process that includes admixing components that include at least one polyisocyanate, i.e., an isocyanate bearing at least two isocyanate groups. Polyisocyanates which may be used include for example aromatic polyisocyanates, aliphatic polyisocyanates, cycloaliphatic polyisocyanates, and combinations thereof. Suitable polyisocyanates include, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4', 4"-triphenylmethane triisocyanate, polymethylene polyphenylene polyisocyanate, 2,4,6-toluene triisocyanate, 4,4'-dimethyl-diphenylmethane tetraisocyanate, prepolymers having a Mn less than 2000 and bearing at least two isocyanate groups, and mixtures thereof. Preferred are 4,4'-diphenylmethane diisocyanate (also called 4,4'-methylene bisphenyl diisocyanate or 4,4'-MDI), 2,4'-diphenylmethane diisocyanate (also called 2,4'-methylene bisphenyl diisocyanate or 2,4'-MDI), and mixtures thereof; more preferred is 4,4'-MDI.

The moisture-reactive hot-melt adhesive composition of the present invention is formed by a process that includes admixing components that include at least one polyol. A polyol is a compound with two or more hydroxyl functional groups. Suitable polyols include a wide variety of compounds, some of which are described in *Polyurethane Handbook*, $2^{nd}$ edition, edited by G. Oertel, Hanser Publishers, 1994. In addition to the hydroxyl functions, suitable polyols may contain other functionality, such as for example carbonyl, carboxyl, anhydride, unsaturation, or other functional groups. Suitable polyols include, for example, polyether polyols, polyester polyols, polyetherester polyols (sometimes called polyether ester polyols and/or polyester ether polyols), fatty polyols, and mixtures thereof. Suitable polyol(s) may be independently selected from crystalline, semi-crystalline, or amorphous polyols.

Polyester polyols suitable for use in the present invention include those formed from diacids, or their monoester, diester, or anhydride counterparts, and diols. The diacids may be saturated $C_4$-$C_{12}$ aliphatic acids, including branched, unbranched, or cyclic materials, and/or $C_8$-$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, dimer fatty acids, and 2-methylpentanedioic acids. Examples of suitable aromatic acids include, for example, terephthalic, isophthalic, phthalic, 4,4'-benzophenone dicarboxylic, 4,4'-diphenylamide dicarboxylic acids, and mixtures thereof. The diols may be $C_2$-$C_{12}$ branched, unbranched, cyclic aliphatic, or aromatic diols. Examples of suitable diols include, for example, ethylene glycol, 1,3-propylene glycol, 1,2-propylene glycol, 1,4-butanediol, neopentyl glycol, 1,3-butanediol, hexanediols, 2-methyl-2,4-pentanediol, cyclohexane-1,4-dimethanol, 1,12-dodecanediol, diethylene glycol, and mixtures thereof. Mixtures of the various suitable polyester polyols are also suitable for use in the present invention. The preferred polyester polyols are formed from 1,6-hexanediol, neopentyl glycol, ethylene glycol, or mixtures thereof and adipic, sebacic, azelaic, dodecanedioic, phthalic, isophthalic or terephthalic acid or mixtures thereof. The polyester polyol(s) preferably has a weight-average molecular weight ("Mw" as measured by gel permeation chromatography) from 250 to 8,000, more preferably 300 to 6,000, even more preferably 400 to 5,000, and most preferably 500 to 4,000.

Polyether polyols suitable for use in the present invention include polyoxy-$C_2$-$C_6$-alkylene polyols, including branched and unbranched alkylene groups. Examples of suitable polyether polyols include, for example, polyethylene glycol, polypropylene glycol, polytetramethylene glycol or random or block copolymers of these polyethers, and mixtures thereof. Mixtures of the various suitable polyether polyols are also suitable for use in the present invention. The preferred polyether polyols are polypropylene glycols, also known as polypropyleneoxides. The polyether polyol preferably has a weight average molecular weight ("Mw" as measured by gel permeation chromatography), from 300 to 8,000, more preferably from 300 to 4,000.

In some embodiments of the present invention, the components include at least one fatty polyol. "Fatty" means herein any compound that contains one or more residues of fatty acids. Fatty acids are long-chain carboxylic acids, with chain length of at least 4 carbon atoms. In embodiments of the present invention in which fatty polyols are used, some preferred fatty polyols are castor oil, the products of hydroxylation of unsaturated or polyunsaturated natural oils, the products of hydrogenations of unsaturated or polyunsaturated polyhydroxyl natural oils, polyhydroxyl esters of alkyl hydroxy fatty acids, polymerized natural oils, and alkylhydroxylated amides of fatty acids. More preferred are castor oil, hydroxylated soybean oil, ethoxylated castor oil, polymerized castor oil, hydroxy ethyl ricinoleate, and hydroxy ethyl ricinoleamide. Most preferred is castor oil.

In some embodiments of the present invention, the components of the adhesive composition include at least one polyol selected from the following: polyether polyols, polyester polyols, fatty polyols, and mixtures thereof. Also contemplated are components that include at least one polyether polyol and at least one polyester polyol. Further contemplated are components that include at least one polyether polyol, at least one polyester polyol, and at least one fatty polyol. When polyether polyol(s) and polyester polyol(s) are both used, the preferred weight ratio of polyether polyols to polyester polyols is from 0.1:1 to 9:1; more preferred is 0.2:1 to 10:1; even more preferred is 0.4:1 to 8:1; most preferred is 0.5:1 to 5:1. When fatty polyol(s) are used in addition to other polyols, the preferred weight ratio of fatty polyols to all other polyols is 0.005:1 to 5:1; more preferred is 0.008:1 to 1:1; even more preferred is 0.01:1 to 0.5:1, and most preferred is 0.02:1 to 0.1:1.

In some embodiments of the present invention, the moisture-reactive hot-melt adhesive composition of the present invention is formed by a process that includes admixing components that include at least one amorphous polyol. Amorphous polyols are those that do not show a detectible melting peak in Differential Scanning Calorimetry (DSC) analysis of the pure polyol. In some embodiments, all the polyols used in forming the moisture-reactive hot-melt adhesive composition are amorphous.

The moisture-reactive hot-melt adhesive composition of the present invention is formed by a process that includes admixing components that include at least one non-reactive acrylic polymer. Non-reactive acrylic polymers are acrylic polymers that have few or no reactive groups. A reactive group is a chemical group that is one of the following: acid, hydroxyl, amine, isocyanate, and thio. Some non-reactive acrylic polymers have no reactive groups, while other non-reactive acrylic polymers have a relatively small amount of reactive groups. Acrylic polymers with a total number of reactive groups in the amount of 70 micromole of reactive groups per gram of non-reactive acrylic polymer or less are considered herein to be non-reactive; various embodiments may have 60 micromole per gram of non-reactive acrylic polymer or less; 50 micromole per gram of non-reactive acrylic polymer or less; 25 micromole per gram of non-reactive acrylic polymer or less; 10 micromole per gram of non-reactive acrylic polymer or less; or no reactive groups. Among non-reactive acrylic polymers that have a suitably small amount of reactive groups, preferred are those in which the reactive groups include carboxylic acid.

Some suitable non-reactive acrylic polymers that have a suitably small amount of reactive groups are made by polymerizing monomers that include one or more reactive monomer. That is, such a polymer incorporates a suitably small amount of reactive monomer. Reactive monomers are those that have reactive groups (as defined herein above) that remain present on the polymer after the polymerization process. In some embodiments, the non-reactive acrylic polymer will incorporate a suitably small amount of monomer with one type of reactive group while incorporating no monomer with any of the other types of reactive groups. For example, in one embodiment, the non-reactive acrylic polymer incorporates a suitably small amount of one or more monomers that have carboxylic acid groups while incorporating no monomers that have hydroxyl, amine, or thio groups. In other embodiments, the suitable non-reactive acrylic polymer that has a suitably small amount of reactive groups may have any combination or selection of reactive groups.

Contemplated as embodiments of the present invention are adhesive compositions formed by a process that includes admixing components that include non-reactive acrylic polymers that not only have few or no reactive groups as defined herein above but also lack other chemically active groups. By "other chemically active group" is meant herein a group, other than the reactive groups defined herein above, that can undergo chemical reactions to form chemical bonds (such as, for example, ionic or covalent bonds) with an identical other chemically active group, with a different other chemically active group, with a reactive group, or with a any combination thereof, under conditions normally used for curing of polymer adhesives or polymer coatings. Other chemically active groups include, for example, epoxy, carbonyl, amine, nitrate, nitrile, sulfate, similarly reactive groups, and combinations and mixtures thereof. A non-reactive acrylic polymer is said herein to "lack" a certain other chemically active group if the non-reactive acrylic polymer has none of that other chemically active group or has 70 micromole or less of that other chemically reactive group per gram of non-reactive acrylic polymer. When a non-reactive acrylic polymer is said herein to "lack" a certain other chemically active group, also contemplated are non-reactive acrylic polymers that have amounts of that certain other chemically active group per gram of non-reactive acrylic polymer of 60 micromole or less; 50 micromole or less; 25 micromole or less; 10 micromole or less; or none. Contemplated for use in the present invention are nonreactive acrylic polymers that any lack one of or any combination of other chemically active groups.

Preferred non-reactive acrylic polymers incorporate 50% or more by weight (meth)acrylic monomers, based on the weight of the non-reactive acrylic polymer; more preferred non-reactive acrylic polymers incorporate 75% or more by weight (meth)acrylic monomers; even more preferred non-reactive acrylic polymers incorporate 95% or more by weight (meth)acrylic monomers. Also contemplated are non-reactive acrylic polymers that incorporate 100% by weight (meth) acrylic monomers, based on the weight of the non-reactive acrylic polymer.

Certain embodiments of the non-reactive acrylic polymers of the present invention are non-reactive acrylic polymers that incorporate one or more alkyl methacrylate esters; when alkyl methacrylate esters are used, preferred are esters wherein the alkyl group consists of a linear, branched or cyclic alkyl group with 1 to 70 carbon atoms; more preferred is 1 to 10 carbon atoms; and most preferred is 1 to 4 carbon atoms. Also contemplated are non-reactive acrylic polymers that incorporate one or more acid-functional monomers such as for example acrylic acid, methacrylic acid, crotonic acid, itaconic acid, fumaric acid, maleic acid, monomethyl itaconate, monomethyl maleate, monobutyl maleate, maleic anhydride, or mixtures thereof when an acid-functional monomer is used, preferred are acrylic acid, methacrylic acid, and mixtures thereof.

The non-reactive acrylic polymer of the present invention may be made by any means known in the art, including, for example, bulk polymerization, solution polymerization, suspension polymerization, or emulsion polymerization, as taught by K. J. Saunders in *Organic Polymer Chemistry*, Chapman and Hall, London, 1973. If water is used as the continuous phase of the polymerization (as in, for example, aqueous suspension or emulsion polymerizations), most or all of the water must be removed from the non-reactive acrylic polymer before the non-reactive acrylic polymer is included in the moisture-reactive composition of the present invention. If solution polymerization is used, the solvent may be any solvent that has suitable compatibility with the monomer or monomers and with the resulting polymer. Toluene is known to be suitable. If any of the other components of the present invention, such as for example a liquid polyol, has suitable compatibility with the acrylic monomers and the non-reactive acrylic polymer, that component may be used as the polymerization solvent for the non-reactive acrylic polymer.

When the non-reactive acrylic polymer of the present invention is made by solution polymerization in a solvent that is not one of the components of the present invention, the solvent may be removed, if desired, before the non-reactive acrylic polymer is added to the other components of the present invention. Alternatively, the solution containing the non-reactive acrylic polymer may be added to one or more components of the present invention and the solvent may be removed from the mixture, if desired, by means known in the art such as for example applying full or partial vacuum and/or by heating; such removal may be performed before, during, or after the preparation of the adhesive compositions of the present invention.

The non-reactive acrylic polymer of the present invention may be amorphous, crystalline, or a mixture of amorphous and crystalline; preferred are amorphous polymers. Crystalline polymers are those with a melting peak detectable by DSC analysis; and amorphous polymers are those that are not crystalline.

The amount of non-reactive acrylic polymer preferred for use in the present invention is 1 to 50% by weight, based on the weight of the reactive hot-melt adhesive composition. In some embodiments, the amount of non-reactive acrylic polymer is 5% or more by weight, based on the weight of the reactive hot-melt adhesive composition; in other embodiments, 10% or more; in still other embodiments, 20% or more. In some embodiments, the amount of non-reactive acrylic polymer is 45% or less by weight, based on the weight of the reactive hot-melt adhesive composition.

In some embodiments, the non-reactive acrylic polymer has weight-average molecular weight ($M_w$), as measured by gel permeation chromatography, of 40,000 or more; in other embodiments, 45,000 or more; in still other embodiments, 50,000 or more. In some embodiments, the non-reactive acrylic polymer has $M_w$ of 100,000 or less; in other embodiments, 90,000 or less; and in still other embodiments 80,000 or less.

In some embodiments, the non-reactive acrylic polymer has glass transition temperature ($T_g$, as measured by DSC, using the midpoint method) of 20° C. or higher; in other embodiments, 30° C. or higher; in still other embodiments, 40° C. or higher; in yet other embodiments, 45° C. or higher. In various embodiments, the non-reactive acrylic polymer has $T_g$ of 120° C. or lower; or 100° C. or lower; or 90° C. or lower; or 80° C. or lower.

In the practice of the present invention, in some embodiments, the admixture of components contains no reactive acrylic polymer. Reactive acrylic polymers are acrylic polymers that are not non-reactive (as defined herein above). It is contemplated that other embodiments will include small amounts of reactive acrylic polymer. Suitable are admixtures of components that contain 0.5% or less by weight reactive acrylic polymer based on the weight of the adhesive composition. Preferred are admixtures of components that contain 0.2% or less by weight reactive acrylic polymer based on the weight of the adhesive composition; more preferred admixtures contain 0.1% or less; still more preferred admixtures contain 0.05% or less.

Also contemplated in the practice of the present invention are embodiments of the adhesive composition in which the admixture of components contains no (or contains a suitably small amount of) reactive acrylic polymer and also contains no (or contains a relatively small amount of) otherwise chemically active acrylic polymer. An "otherwise chemically active acrylic polymer" means an acrylic polymer that contains more than 70 micromole of other chemically active groups (as defined herein above) per gram of that acrylic polymer. A relatively small amount of otherwise chemically active acrylic polymer is considered herein to be 0.5% or less by weight based on the weight of adhesive composition. Also contemplated are the following amounts of active acrylic polymer by weight based on the weight of adhesive composition: 0.2% or less; 0.1% or less; 0.05% or less; and 0%.

One aspect of the adhesive compositions of the present inventions is the open time. The open time is measured as follows: a quantity of the adhesive composition is heated to equilibrium at 120° C. and then applied at thickness of 0.1 mm (0.004 inch) to a first piece of birch laminated plywood of size 76 mm×152 mm (3 inch×6 inch). After a pause interval (typical pause intervals are from 30 seconds to 2 days), a second piece of birch laminated plywood, size 25.4 mm×50.8 mm (1 inch×2 inch), is contacted to the adhesive composition to form a composite so that the overlap area on each piece of wood is 645 mm$^2$ (1 inch$^2$). A weight of 4.54 kg (10 lb) is placed on the composite for 10 seconds to form a laminate. A variety of laminates are made using a variety of pause intervals. The laminates are stored at 25° C. and 50% relative humidity (RH) for 1 day and then tested in a tensile tester with a pull rate of 1.3 mm/min (0.05 inch/min) in lap shear mode.

In the practice of the open time test, after the tensile test, the failure type is observed. One aspect of the failure type is known herein as "percent contactability." To determine percent contactability as defined herein, after the tensile test, the surface of the second piece of plywood is visually observed in the region of the overlap with the first piece of plywood; the percentage of surface of the second piece of plywood in the overlap region to which adhesive composition appears to be adhered is the percent contactability. Another aspect of the failure type is the presence or absence of wood tear. In some cases, independent of the percent contactability, one or both pieces of plywood is observed to fail by breaking, rupturing, tearing, delaminating, otherwise undergoing mechanical breakdown, or a combination thereof. Such cases are known herein as "wood tear." An acceptable bond is one that results in one or both of the following: wood tear or percent contactability of 75% or greater. A characteristic of the adhesive compositions of the present invention is that they are capable of forming acceptable bonds in the open time test when the pause interval is short enough. The open time is the longest pause interval that would result in a laminate with an acceptable bond. After an open time test is performed, the open time is known to be at least as long as the longest actually-tested pause interval that resulted in a sample with an acceptable bond; and the open time also is known to be less that the shortest actually-tested pause interval that resulted in a sample that did not have an acceptable bond. Some adhesive compositions of the present invention have open time of 2 days or shorter; others have open time of 1 day or shorter; still others have open time of 10 hours or shorter; or 3 hours or shorter; or 1 hour or shorter; or 20 minutes or shorter; or 10 minutes or shorter; or 5 minutes or shorter.

The adhesive compositions of the present invention are capable of forming an acceptable bond in the open time test as defined herein. This capability of forming an acceptable bond would be observed if the practitioner were to perform the open time experiment with a sufficiently short pause interval. In many cases, the practitioner will choose to perform the open time test with the pause intervals chosen such that samples made using relatively short pause intervals have acceptable bonds, while samples made using relatively long pause intervals do not have acceptable bonds. Then, the open time is known as explained herein above. In other cases, the practitioner will choose to perform the open time test with the pause intervals chosen such that none of the samples show acceptable bonds in the open time test; that is, the shortest actually-tested pause interval is longer than the open time of the adhesive composition. In such open time tests, the practitioner will not directly observe an acceptable bond in the course of the open time test. However, evidence from other testing can be used to demonstrate that the adhesive is capable of forming an acceptable bond in the open time test. For example, using any of the Peel Test procedures (Peel 1, Peel 2, Peel 3, or Peel 4) defined herein below, if the adhesive composition gives a result of "foil failure," it is considered to be capable of forming an acceptable bond in the open time test.

In contrast to the adhesive compositions of the present invention, some adhesive compositions are not capable of forming an acceptable bond in the open time test, no matter what the pause interval. When such adhesive compostions are tested by other means, such as, for example, the Peel Test procedures defined herein below, they fail to show evidence that they are capable of forming an acceptable bond in the open time test. Such adhesives are considered herein as not having an open time, and such adhesives are not considered to fall within the definition of the present invention.

Another group of adhesive compositions that fall outside of the present invention are those with open times longer than 2 days. Such adhesives are capable of forming an acceptable bond in the open time test defined herein, but they remain capable of forming such a bond even after pause intervals of longer than 2 days. Such adhesive compositions are not considered to fall within the definition of the present invention.

The adhesive compositions of the present invention are not pressure sensitive adhesives (PSA's). One way of distinguishing the adhesive compositions of the present invention from PSA's is the open time test. All PSA's necessarily fall into one of two categories: either they are capable or they are not capable of forming an acceptable bond in the open time test as defined herein. PSA's that are not capable of forming an acceptable bond in the open time test (for example, certain so-called "removable" PSA's) are not adhesive compositions of the present invention. Other PSA's are capable of forming an acceptable bond in the open time test. PSA's are, by definition, tacky materials that adhere to substrates upon application of pressure; they do not cure; and in order to be useful, they must be capable of being stored for long periods of time (usually much longer than 2 days) before being contacted with substrate, and they must remain tacky during that storage time so that they will adhere to the substrate. Thus, PSA's are different from the adhesive compositions of the present invention because they either (1) are not capable of forming acceptable bonds in the open time test or (2) have open times that are longer than those of the adhesive compositions of present invention.

Additionally, the adhesive compositions of the present invention are believed to be different from PSA's because PSA's are tacky, while the adhesive compositions of the present invention, after they have cured, are believed to have poor tack or to be non-tacky. One method of measuring tack is ASTM test D 2979-01.

Many PSA's include tackifying resins, which are resins added to the PSA to improve the tack. Tackifying resins include hydrocarbon-based tackifying resins, rosin-based tackifying resins, and rosin ester tackifying resins. Preferred embodiments of the adhesive composition of the present invention do not include tackifying resin.

In some embodiments, the adhesive composition of the present invention contains 5% or less by weight, based on the weight of the adhesive composition, thermoplastic ethylene copolymer resins. Ethylene copolymer resins are defined herein as copolymers selected from the following: ethylene vinyl acetate copolymers, ethylene acrylate copolymers, ethylene butylacrylate copolymers, and ethylene vinylacetate/ ethylene acrylate terpolymers, where the ethylene vinylacetate/ethylene acrylate terpolymers have an ethylene content from about 10% to about 55% by weight based on the weight of the terpolymer. Also contemplated are embodiments with adhesive compositions that have thermoplastic ethylene copolymer resins in amounts by weight, based on the weight of the adhesive composition, of 2% or less; of 1% or less; and of 0%.

In some embodiments, the adhesive composition of the present invention contains 5% or less by weight, based on the weight of the adhesive composition, any ethylene-incorporating polymers. Ethylene-incorporating polymers, as defined herein, are any polymers that incorporate ethylene as a monomer. Some ethylene-incorporating polymers are, for example, polyethylene, the thermoplastics ethylene copolymer resins described herein above, and other ethylene copolymers. Also contemplated are embodiments with adhesive compositions that have ethylene-incorporating polymers in amounts by weight, based on the weight of the adhesive composition, of 2% or less; of 1% or less; and of 0%.

The components of the present invention preferably contain less than 1% water, more preferably less than 0.2%, even more preferably less than 0.1%, by weight based on the total weight of the components.

The components may be mixed by conventional or other means, preferably in an inert, dry atmosphere. The components may be mixed together all at one time (in a "one stage" process); alternatively, some components and/or portions of components may be mixed together in one operation (or "stage"), with other components and/or portions of components added in additional stage or stages. Normally, the components are heated above room temperature. The components may be heated before, during, or after the process of mixing. If more than one stage of addition of components and/or mixing and/or heating is used, the mixture of one stage may be heated for a time before the next stage is added. Preferred temperature of heating is 50° C. to 130° C. If more than one stage is used, the temperature of each stage may be chosen independently. During any of the mixing and/or heating stages, full or partial vacuum may be applied; also nitrogen gas or other dry and/or inert gas may be used to blanket the surface of the admixture.

During the mixing and/or heating of the components of the present invention, the non-reactive acrylic polymer may be added to any of the stages. In one embodiment, a solution of the non-reactive acrylic polymer is added to one or more polyether polyols, and the mixture is heated under vacuum; other components are then added in one or more stages. If any material that is to be added to the reaction mixture is a solid, it is preferably solubilized by heating and mixing with at least one of the non-isocyanate containing components before being admixed with the polyisocyanate. In addition, a catalyst such as, for example, a tertiary amine or a tin-based catalyst may optionally be admixed with the components, either before, during, or after any one or more of the stages of mixing the components. When such an optional catalyst is used, the usual use level is less than 0.3% by weight based on the total weight of the admixed components. The adhesive composition of this invention, which is an NCO-functional composition, is stored, preferably under an inert, dry atmosphere until use.

The hot-melt adhesive composition may be formulated by admixing additional conventional ingredients such as fillers, pigments, tackifiers, plasticizers, rheology modifiers, other thermoplastic resins, etc. with due regard to the reactivity of the NCO-functional groups, which is desirably maintained. If such additional conventional ingredients are used, they may be added, individually or in any combination, to the admixture before the other ingredients, after the other ingredients, or during any stage or combination of stages of the formation of the admixture.

Independently of the above-mentioned conventional ingredients, in some embodiments, the hot-melt adhesive composition of the present invention includes a cure-catalyst to enhance the reaction of isocyanate and water during cure. One suitable cure-catalyst is dimorpholinoethyl ether. If such a cure-catalyst is used, it may be added to the admixture before the other ingredients, after the other ingredients, or during any stage or combination of stages of the formation of the admixture.

In the method of the present invention for bonding substrates, the moisture-reactive hot-melt adhesive composition is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are in the range of 40° C. to 160° C., preferably 50° C. to 150° C.

The application of the adhesive composition of the present invention may be effected by conventional means such as, for example, heated spray applicator, heated bead applicator, heated nozzle, heater doctor blade, extrusion, and heated roll coater, to form a continuous or discontinuous film of adhesive, as desired. The adhesive composition may also be applied to the substrate by hand, for example with a hand-held tool such as, for example, a spatula or other applicator. The adhesive composition may typically be applied at a level of 50 to 250 $g/m^2$ (4-20 $g/ft^2$) although in cases where one of the substrates is a fabric, it may be applied at a level as low as 1-50 $g/m^2$.

Subsequently or simultaneously, the applied adhesive composition is contacted by at least one subsequent substrate to provide a composite construction. Preferably, the adhesive composition is contacted by the second substrate while the adhesive composition has a temperature substantially above room temperature. The composite construction so formed is optionally subjected to applied pressure such as by passing rollers over it to effect increased contact of the substrates with the adhesive composition. If such optional pressure is applied, it may be applied for a relatively short duration or for a relatively long duration; and it may be constant, increasing, decreasing, or a combination thereof. The composite construction is then cooled or allowed to cool. If optional pressure is applied, cooling may take place during application of the pressure, after application of the pressure, or a combination thereof. In another embodiment, the adhesive composition may be simultaneously or sequentially applied to two surfaces of the first substrate, which adhesive composition-coated surfaces are then simultaneously or sequentially bonded to two or more further substrates, which may be the same or different. It is further contemplated that the composite construction may subsequently be bonded to other substrate(s) using the same or a different adhesive composition before or after the process described herein.

In some embodiments of the present invention, the hot-melt adhesive composition of the present invention bonds at least one rigid lineal article to at least one flexible wrap. The hot-melt adhesive composition may be contacted to at least one rigid lineal substrate and at least one flexible wrap substrate by bringing them together in any of a variety of ways and in any of a variety of orders. In some embodiments, the hot-melt adhesive composition is applied to a rigid lineal article, and a flexible wrap is then contacted to the hot-melt adhesive composition. In some embodiments that are known to be particularly useful, the hot-melt adhesive composition is applied to a flexible wrap, and a rigid lineal article is then contacted to the hot-melt adhesive composition. In other embodiments, the flexible lineal article, the hot-melt adhesive composition, and the flexible wrap are brought together simultaneously. In some embodiments, the rigid lineal article is moved in the direction of its long dimension, and it passes through an assembly area in which it is bonded to the flexible wrap.

It is contemplated that the moisture, i.e., water, which is anticipated to effect reaction with the NCO-functional groups thereby increasing the ultimate cohesive strength of the applied adhesive composition, may be exposed to the moisture-reactive hot-melt adhesive composition of the present invention in any of a variety of ways. For example, after the hot-melt adhesive composition is applied to one substrate but before it is contacted with a second substrate, the hot-melt adhesive composition may be exposed to moisture in any of a variety of ways, including for example ambient humidity, artificially increased or controlled humidified air, a mist of water droplets, a spray of liquid water contacting the applied adhesive composition, or combinations thereof. Alternatively or additionally, after a second substrate is contacted with the hot-melt adhesive composition, the composite structure of substrates and hot-melt adhesive composition may be exposed to moisture in any or all of the above ways. The method of exposing the composite structure to moisture is especially useful when one or more of the substrates is a material that is permeable to water vapor, such as, for example, wood, paper, or textile.

It is further contemplated that the cure process may be augmented by ingredients in addition to water that participate, catalyze, or otherwise facilitate the reactions of NCO functional groups with each other. Such an ingredient may be combined with the moisture during any or all or the curing process. Examples of such ingredients are certain amines, which are known to link NCO functional groups together through formation of biuret linkages. Regardless of mechanism, the use of such ingredients to augment the moisture cure reaction is contemplated in the present invention.

In some embodiments, the cured moisture-reactive hot-melt adhesive composition of the present invention either has a low level of crystallinity or else has no detectable crystallinity. The level of crystallinity is assessed by performing DSC analysis on the cured composition; if no melting peak is detected, the cured composition is said to have no detectable crystallinity. If a melting peak is observed, it is preferred that the integral of the melting peak be 40 Joules per gram of cured adhesive composition (i.e., "J/g") or less; more preferred is 30 J/g or less; even more preferred is 20 J/g or less.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As further examples, if minimum range values of 1 and 2 are recited, and if maximum range values of 3, 4, and 5 are recited, then the following ranges are all contemplated: 1 to 3, 1 to 4, 1 to 5, 2 to 3, 2 to 4, and 2 to 5.

In the Examples below, the following test procedures are used.

Green Strength:

The adhesive is heated to equilibrium at 120° C. It is then applied to 0.125 inch (3.2 mm) thick birch laminated plywood at a thickness of 0.004 inch (0.10 mm). A second piece of identical plywood is laminated to the first, with an overlap area of 1 inch$^2$ (645 mm$^2$). The laminate is nipped under pressure of 10 psi (69 kPa). After a waiting interval, the strength of the laminate is measured with a tensile tester, using a pull rate of 0.05 inch/min (1.3 mm/min), in lap shear mode. The reported quantity is the maximum force divided by the overlap area. Enough laminates are produced so that measurements are made in triplicate at each waiting interval of 5, 10 and 30 minutes.

Green strength is desirably at least 5 psi (2.1 kPa) at 5 minutes, and it desirably increases as it is tested at longer waiting intervals.

Open Time:

Using the open time test defined herein above, samples were tested with various pause intervals.

Preparation of Adhesion Samples (Used for Peel and Edge-Lift Tests):

The adhesive is first heated to equilibrium at 120° C. Approximately 20 grams of the adhesive is poured onto a 30 cm×30 cm sheet of silicone release paper. The release paper and adhesive are then drawn through a hot melt roll coater to reduce the adhesive thickness to 50 microns. The adhesive is then transfer coated to a 4.4 cm×15 cm piece of flexible foil (using either PVC foil or acrylic foil), with the adhesive covering an 4 cm×8 cm area of the foil. The foil/adhesive composite and a 4 cm×10 cm piece of rigid PVC which had been pre-conditioned by wiping with methyl ethyl ketone are placed in an oven at 65° C. for 1.5 minutes. Upon removal of the substrates, the foil and rigid PVC are laminated together and nipped with a hand-roller. The 0.4 cm overlap of foil is wrapped over the edge of the profile and hand-rolled.

Edge Lift Test:

Using Adhesion samples (defined above), Edge Lift is evaluated visually, five minutes after hand rolling. The ability of the adhesive to hold down the edge of the foil is rated as one of the following:

"no" (i.e., no lifting of the edge—most desirable),

"slight" (i.e., slight lifting of the edge), or

"yes" (i.e., significant lifting of the edge—least desirable).

Peel Tests:

Adhesion Samples (defined above) are stored in a constant temperature (25° C.) and humidity (50% RH) room for 7 days and then tested in a 90° peel adhesion tester at a pull rate of 10 mm/min. Samples are also tested after an additional 7 days of heat and humidity aging. Peel test types are defined herein as follows:

Peel 1: PVC foil; 7 days at 25° C. and 50% RH.

Peel 2: PVC foil; 7 days at 25° C. and 50% RH, plus additional 7 days at 60° C. and 65% RH.

Peel 3: acrylic foil; 7 days at 25° C. and 50% RH.

Peel 4: acrylic foil; 7 days at 25° C. and 50% RH, plus additional 7 days at 70° C. and 95% RH.

After the peel test, the failure mode is observed visually and recorded as one of the following:

ff="foil failure": laminate fails by the foil rupturing or breaking ap="adhesive-profile": laminate separates at the adhesive-profile boundary—the adhesive remains on the foil am="adhesive-mixed": laminate separates without rupturing, with some of the adhesive remaining on the profile and some remaining on the foil af="adhesive-foil": laminate separates at the adhesive-foil boundary—the adhesive remains on the profile In cases where the failure mode is ap, am, or af, the maximum peel force (in N/mm) is recorded. Values of >2.5 N/mm in Peel tests 1 and 3 and >2.0 N/mm in Peel tests 2 and 4 are desirable.

EXAMPLES

Example 1

The ingredients were as follows:

| | | |
|---|---|---|
| (1) | polypropylene glycol (Mw 2000) | 121.87 g |
| (2) | Castor Oil | 10.21 g |
| (3) | Paraloid ™ B-60, 50 wt % in toluene (Paraloid ™ B-60 is an acrylic terpolymer, product of Rohm and Haas Co.) | 280.00 g |
| (4) | 4,4' Methylene bisphenyl diisocyanate | 87.87 g |
| (5) | Neopentyl glycol adipate (Mw 1000) | 140.06 g |
| (6) | 2,2' dimorpholinoethyl ether | 0.30 g |

To a 1 liter resin kettle were added raw materials (1) thru (3). After fitting the kettle with a mechanical stirrer and reactor head, heat was applied to the kettle to raise the temperature to 85° C. At that point, a vacuum of 27-28 in. Hg (67 kPa) was gradually applied to the kettle to remove the toluene. After removing the bulk of the solvent, the temperature was slowly raised to 115° C. to remove residual solvent and moisture. After 30 minutes under these conditions, the temperature was lowered to 105° C. and the vacuum released with dry nitrogen. Item (4) was then added and the vacuum restored. The temperature was allowed to re-equilibrate to 100° C., at which temperature the reaction was allowed to proceed for 90 minutes. The vacuum was once again released with dry nitrogen, at which point item (5) was added. After re-applying the vacuum, the reaction was continued for 30 minutes at 100° C. Item (6) was then added after releasing the vacuum with nitrogen. The mixture was allowed to mix for an additional 30 minutes under nitrogen. The reactive hot melt was then heated to 115° C. and poured into a 1 pint (0.47 liter) plastic container where it was blanketed with nitrogen and sealed.

Example 2

The ingredients were as follows:

| | | |
|---|---|---|
| (1) | polypropylene glycol (Mw 2000) | 126.01 g |
| (2) | Castor Oil | 10.31 g |
| (3) | Paraloid ™ B-60, 50 wt % in toluene | 280.00 g |
| (4) | 4,4' Methylene bisphenyl diisocyanate | 83.66 g |
| (5) | Neopentyl glycol adipate (Mw 1000) | 140.02 g |
| (6) | 2,2' dimorpholinoethyl ether | 0.30 g |

To a 1 liter resin kettle were added raw materials (1) thru (3). After fitting the kettle with a mechanical stirrer and reactor head, heat was applied to the kettle to raise the temperature to 85° C. At that point, a vacuum of 27-28 in. Hg (67 kPa) was gradually applied to the kettle to remove the toluene. After removing the bulk of the solvent, the temperature was slowly raised to 115° C. to remove residual solvent and moisture. After 30 minutes under these conditions, the temperature was lowered to 105° C. and the vacuum released with dry nitrogen. Item (4) was then added and the vacuum restored. The temperature was allowed to re-equilibrate to 100° C., at which temperature the reaction was allowed to continue for 90 minutes. The vacuum was once again released with dry nitrogen, at which point item (5) was added. After re-applying the vacuum, the reaction was continued for 30 minutes at 100° C. Item 6 was then added after releasing the vacuum with dry nitrogen. The mixture was then allowed to stir for an additional 30 minutes under nitrogen. The reactive hot melt was then heated to 115° C. and poured into a 1 pint (0.47 liter) plastic container where it was blanketed with nitrogen and sealed.

Example 3

The ingredients were as follows:

| | | |
|---|---|---|
| (1) | polypropylene glycol (Mw 4000) | 135.12 g |
| (2) | Castor Oil | 8.81 g |
| (3) | Paraloid ™ B-60 | 140.00 g |
| (4) | Irganox ™ 245 (Irganox ™ 245 is an antioxidant, available from Ciba Specialty Chemical Corp.) | 0.15 g |
| (5) | 4,4' Methylene bisphenyl diisocyanate | 76.06 g |
| (6) | Neopentyl glycol adipate (Mw 1000) | 140.00 g |
| (7) | 2,2' dimorpholinoethyl ether | 0.30 g |

To a 1 liter resin kettle were added raw materials (1) thru (4). After fitting the kettle with a mechanical stirrer and reactor head, heat was applied to the kettle to raise the temperature to 150° C. The reaction mixture was maintained under nitrogen at this temperature with stirring for 60 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen and item (5) was added. The temperature was allowed to re-equilibrate to 100° C., at which temperature the reaction mixture was allowed to hold for 90 minutes under nitrogen. Item (6) was then added and the mixture was allowed to react at 100° C. under nitrogen for 30 minutes. Item (7) was then added and the mixture stirred for an additional 30 minutes under nitrogen. The reactive hot melt was heated to 115° C. and poured into a 1 pint (0.47 liter) plastic container where it was blanketed with nitrogen and sealed.

Example 4

The ingredients were as follows:

| | | |
|---|---|---|
| (1) | polypropylene glycol (Mw 2000) | 156.07 g |
| (2) | Castor Oil | 5.36 g |
| (3) | Paraloid ™ B-60 | 140.00 g |
| (4) | Foamblast ™ 20F (Foamblast ™ 20F is a defoamer from Ross Chem.) | 0.05 g |
| (5) | 4,4' Methylene bisphenyl diisocyanate | 58.48 g |
| (6) | Dynacoll ™ 7250 (polyester polyol from Degussa, with hydroxyl number of 21) | 140.08 g |
| (7) | 2,2' dimorpholinoethyl ether | 0.30 g |

To a 1 liter resin kettle were added raw materials (1) thru (4). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 110° C. and a vacuum of 27-28 in. Hg (91 kPa) was placed on the system to remove residual moisture. After 30 minutes under these conditions, the vacuum was released with dry nitrogen. Item (5) was then added and the vacuum restored. The temperature was allowed to re-equilibrate to 100° C., at which temperature the reaction was allowed to proceed for 30 minutes. After 30 minutes, the vacuum was released with dry nitrogen and mixed for an additional 60 minutes. Item (6) was then added and the vacuum was restored. After 30 minutes, the vacuum was released with dry nitrogen, item (7) was then added and the mixture was allowed to heat for an additional 90 minutes under nitrogen. The reactive hot melt was heated to 115° C. and poured into a 1 pint (0.47 liter) plastic container where it was blanketed with nitrogen and sealed.

Example 5

The ingredients were as follows:

| (1) | polypropylene glycol (Mw 2000) | 314.54 g |
|---|---|---|
| (2) | Castor Oil | 15.97 g |
| (3) | Paraloid ™ B-60 | 262.50 g |
| (4) | Irganox ™ 245 | 0.32 g |
| (5) | 4, 4' Methylene bisphenyl diisocyanate | 150.06 g |
| (6) | 1,6 Hexanediol adipate (hydroxyl number of 55) | 306.92 g |
| (7) | 2,2' dimorpholinoethyl ether | 0.63 g |

To a 1 liter resin kettle were added raw materials (1) thru (4). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen, item (5) was added and the vacuum restored. The temperature was allowed to re-equilibrate to 100° C., at which temperature the reaction was allowed to proceed for 30 minutes. After 30 minutes, the vacuum was released with dry nitrogen and mixed for an additional 60 minutes. Item (6) was then added and the vacuum was restored. After 30 minutes, the vacuum was released with dry nitrogen, item (7) was added and the mixture was allowed to stir for an additional 30 minutes under nitrogen. The reactive hot melt was heated to 115° C. and poured into a 1 pint (0.47 liter) plastic container where it was blanketed with nitrogen and sealed.

Example 6

The ingredients were as follows:

| (1) | Polypropylene glycol (Mw 2000) | 123.21 g |
|---|---|---|
| (2) | Neopentylglycol adipate (hydroxyl number of 56) | 42.00 g |
| (3) | Castor Oil | 8.37 g |
| (4) | Paraloid ™ B-60 | 137.50 g |
| (5) | Irganox ™ 245 | 0.17 g |
| (6) | 4,4' Methylene bisphenyl diisocyanate | 78.60 g |
| (7) | 1,6 Hexanediol adipate (hydroxyl number of 56) | 160.31 g |
| (8) | 2,2' dimorpholinoethyl ether | 0.33 g |

To a 1 liter resin kettle were added raw materials (1) thru (5). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen, item (6) was added and the vacuum restored. The temperature was allowed to re-equilibrate to 100° C., at which temperature the reaction was allowed to continue for 30 minutes. After 30 minutes, the vacuum was released with dry nitrogen and mixed for an additional 60 minutes. Item (7) was then added. The vacuum was restored and the temperature was equilibrated to 100° C. After 30 minutes, the vacuum was released with dry nitrogen. Item (8) was added and the mixture was allowed to stir for an additional 30 minutes under nitrogen. The reactive hot melt was heated to 115° C. and poured into a 1 pint (0.47 liter) plastic container where it was blanketed with nitrogen and sealed.

Example 7

The ingredients were as follows:

| (1) | Polypropylene glycol (Mw 2000) | 180.13 g |
|---|---|---|
| (2) | Castor Oil | 7.51 g |
| (3) | Paraloid ™ B-66, 51 wt % in toluene (Paraloid ™ B-66 is an acrylic terpolymer available from Rohm and Haas Co.) | 257.35 g |
| (4) | Irganox ™ 245 | 0.16 g |
| (5) | 4,4' Methylene bisphenyl diisocyanate | 74.87 g |
| (6) | 1,6 Hexanediol adipate (hydroxyl number of 56) | 131.25 g |
| (7) | 2,2' dimorpholinoethyl ether | 0.31 g |

To a 1 liter resin kettle were added raw materials (1) thru (4). After fitting the kettle with a mechanical stirrer and reactor head, heat was applied to the kettle to raise the temperature to 90° C. At that point, a vacuum of 27-28 in. Hg (67 kPa) was gradually applied to the kettle to remove the toluene. After removing the bulk of the solvent, the temperature was slowly raised to 115° C. to remove residual solvent and moisture. After 30 minutes under these conditions, the vacuum was released with dry nitrogen. Item (5) was then added and the vacuum restored. The temperature was allowed to re-equilibrate to 100° C., at which temperature the reaction was allowed to proceed for 30 minutes. The vacuum was once again released with dry nitrogen, and the mixture allowed to stir for an additional 60 minutes. Item (6) was then added. After restoring the vacuum, the reaction was allowed to continue at 100° C. for 30 minutes. After releasing the vacuum, item (7) was added and the mixture was allowed to heat for an additional 30 minutes under nitrogen. The reactive hot melt was heated to 115° C. and poured into a 1 pint (0.47 liter) plastic container where it was blanketed with nitrogen and sealed.

Example 8

The ingredients were as follows:

| (1) | Polypropylene glycol (Mw 2000) | 162.67 g |
|---|---|---|
| (2) | Castor Oil | 8.31 g |
| (3) | Paraloid ™ B-60 | 137.50 g |
| (4) | Irganox ™ 245 | 0.17 g |
| (5) | Foamblast ™ 20F | 0.06 g |
| (6) | 4, 4' Methylene bisphenyl diisocyanate | 80.94 g |
| (7) | 1,6 Hexanediol adipate (hydroxyl number of 56) | 160.58 g |
| (8) | 2,2' dimorpholinoethyl ether | 0.33 g |

To a 1 liter resin kettle were added raw materials (1) thru (5). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen, item (6) was added and the vacuum restored. The temperature was allowed to re-equilibrate to 100° C., at which temperature the reaction was allowed to continue for 30 minutes. After 30 minutes, the vacuum was released with dry nitrogen and mixed for an additional 60 minutes. Item (7) was then added. The vacuum was restored and the temperature was equilibrated to 100° C. After 30 minutes, the vacuum was released with dry nitrogen. Item (8) was added and the mixture was allowed to stir for an additional 30 minutes under nitrogen. The reactive hot melt was heated to 115° C. and poured into a 1 pint (0.47 liter) plastic container where it was blanketed with nitrogen and sealed.

Example 9

The ingredients were as follows:

| (1) | polypropylene glycol (Mw 2000) | 286.67 g |
| --- | --- | --- |
| (2) | Castor Oil | 23.45 g |
| (3) | Paraloid ™ B-60 | 231.00 g |
| (4) | Irganox ™ 245 | 0.32 g |
| (5) | 4,4' Methylene bisphenyl diisocyanate | 190.82 g |
| (6) | Neopentyl glycol adipate (Mw 1000) | 318.55 g |
| (7) | 2,2' dimorpholinoethyl ether | 0.63 g |

To a 1 liter resin kettle were added raw materials (1) thru (4). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen, item (5) was added and the vacuum restored. The temperature was allowed to re-equilibrate to 100° C., at which temperature the reaction was allowed to continue for 30 minutes. After 30 minutes, the vacuum was released with dry nitrogen and mixed for an additional 60 minutes. Item (6) was then added. The vacuum was restored and the temperature was equilibrated to 100° C. After 30 minutes, the vacuum was released with dry nitrogen. Item (7) was added and the mixture was allowed to stir for an additional 30 minutes under nitrogen. The reactive hot melt was heated to 115° C. and poured into a 1 pint (0.47 liter) plastic container where it was blanketed with nitrogen and sealed.

Example 10

The ingredients were as follows:

| (1) | polypropylene glycol (Mw 2000) | 136.11 g |
| --- | --- | --- |
| (2) | Castor Oil | 11.13 g |
| (3) | Paraloid ™ B-60 | 154.00 g |
| (4) | Irganox ™ 245 | 00.17 g |
| (5) | Foamblast ™ 20F | 0.055 g |
| (6) | 4,4' Methylene bisphenyl diisocyanate | 94.76 g |
| (7) | Neopentyl glycol adipate (Mw 1000) | 154.00 g |
| (8) | 2,2' dimorpholinoethyl ether | 0.33 g |

To a 1 liter resin kettle were added raw materials (1) thru (5). After fitting the kettle with a mechanical stirrer and reactor head, heat was applied to the kettle to raise the temperature to 150° C. The reaction mixture was maintained under nitrogen at this temperature with stirring for 120 minutes. At this point, the temperature was reduced to 115° C. and a vacuum of 27-28 in. Hg (91 kPa) was placed on the system to remove residual moisture. After 30 minutes under these conditions, the vacuum was released with dry nitrogen, item (6) was added and the vacuum restored. The temperature was allowed to re-equilibrate to 100° C., at which temperature the reaction was allowed to continue for 30 minutes. After 30 minutes, the vacuum was released with dry nitrogen and mixed for an additional 60 minutes. Item (7) was then added. The vacuum was restored and the temperature was equilibrated to 100° C. After 30 minutes, the vacuum was released with dry nitrogen. Item (8) was added and the mixture was allowed to stir for an additional 30 minutes under nitrogen. The reactive hot melt was heated to 115° C. and poured into a 1 pint (0.47 liter) plastic container where it was blanketed with nitrogen and sealed.

Example 11

The adhesives of Examples 1-10 were tested, and the results were as follows (green strength was tested at 5 minutes):

| Adhesive: Example No. | Green Strength kPA (PSI) | Edge Lift | Peel 1 N/mm, FM[2] | Peel 2 N/mm, FM[2] | Peel 3 N/mm, FM[2] | Peel 4 N/mm, FM[2] | Open Time (min.) |
| --- | --- | --- | --- | --- | --- | --- | --- |
| 1 | 114 (16.6) | no | ff | 2.9, ap | NT[1] | NT[1] | <1 |
| 2 | 123 (17.8) | no | ff | 3.1, ap | ff | ff | <1 |
| 3 | 92 (13.4) | no | ff | 3.1, ap | NT[1] | NT[1] | NT[1] |
| 4 | NT[1] | slight | ff | 3.1, am | ff | ff | <3 |
| 5 | 164 (23.8) | slight | ff | ff | NT[1] | NT[1] | NT[1] |
| 6 | 96 (14.0) | no | ff | 2.9, ap | ff | ff | <1 |
| 7 | 8.3 (1.2) | yes | NT[1] | NT[1] | NT[1] | NT[1] | <10[3] |
| 8 | 68 (9.9) | slight | ff | 3.0, ap | ff | 2.2, af/ff | <3 |
| 9 | 41 (6.0) | slight | ff | 2.9, ap | ff | ff | <3 |
| 10 | 97 (14.1) | no | ff | ff | NT[1] | NT[1] | NT[1] |

[1]NT = not tested
[2]FM = failure mode
[3]Example 7 showed acceptable bond at 5 minutes but not at 10 minutes.

The test results show that examples 1-6 and 8-10 have good adhesive strength, as shown, for example, by the Peel1 results. Also, examples 1, 2, 4, 6, and 8 have desirable open times. In Example 7, the nonreactive acrylic polymer had a lower Tg than that of the other examples; thus, lower green strength and longer open time is expected. It is expected that Example 7 would show improved edge lift if it were pressed onto the substrate for longer time than was used in the above test, and it is expected that Example 7 would show acceptable results in the Peel Tests.

Example 12

Articles could be made using the adhesive compositions of examples 1-10, and a comparative PSA adhesive composition, using a variety of rigid lineal substrates and flexible wrap substrates as shown in the following table. Also shown in the table is that the properties of such articles, when made with examples 1-10, would all be useful, while articles made with the comparative PSA would not be useful.

| Adhesive (Example #) | Lineal Substrate | Flexible Wrap | Properties |
| --- | --- | --- | --- |
| 1 | PVC[1] | PVC foil | useful |
| 1 | PVC[1] | acrylic foil | useful |
| 1 | Wood[2] | PVC foil | useful |
| 1 | Wood[2] | acrylic foil | useful |
| 2 | PVC[1] | acrylic foil | useful |
| 3 | PVC[1] | acrylic foil | useful |
| 4 | PVC[1] | acrylic foil | useful |
| 5 | PVC[1] | acrylic foil | useful |
| 6 | PVC[1] | acrylic foil | useful |
| 7 | PVC[1] | acrylic foil | useful |
| 8 | PVC[1] | acrylic foil | useful |
| 9 | PVC[1] | acrylic foil | useful |
| 10 | PVC[1] | acrylic foil | useful |
| comparative PSA | PVC[1] | acrylic foil | poor adhesion |

[1]rigid extruded profile
[2]molding

Example 13

Testing could be performed on the tack of adhesive compositions of examples 1-10 and also on the tack of a comparative PSA adhesive composition. The results of such testing would be as follows:

| Adhesive (Example #) | tack |
| --- | --- |
| 1 | poor |
| 2 | poor |
| 3 | poor |
| 4 | poor |
| 5 | poor |
| 6 | poor |
| 7 | poor |
| 8 | poor |
| 9 | poor |
| 10 | poor |
| comparative PSA | good |

These tests would show that the properties of examples 1-10 would be different from those of a comparative PSA.

Example 14

A comparative removable PSA adhesive composition could be tested in the open time test. It could be tested at pause intervals of 30 seconds, 2 minutes, 10 minutes, 1 hour, 5 hours, and 2 days. None of the samples would form an acceptable bond.

Example 15

A comparative PSA (different from the removable PSA of Example 14) that is capable of forming an acceptable bond in the open time test could be tested in the open time test. It would demonstrate acceptable bonds at pause intervals of 1 hour, 1 day, 2 days, 2.5 days, 3 days, 5 days, and 7 days.

I claim:

1. A method for bonding substrates comprising the steps of
 (a) heating a moisture-reactive hot-melt adhesive composition formed by a process comprising admixing components comprising at least one polyol; at least one polyisocyanate; at least one amorphous non-reactive acrylic polymer having a weight-average molecular weight of 40,000 or greater; 0.5% or less by weight reactive acrylic polymer, based on the weight of said hot-melt adhesive composition; and 5% or less by weight thermoplastic ethylene copolymer resins, based on the weight of said hot-melt adhesive composition; wherein said amorphous non-reactive acrylic polymer has no hydroxyl groups;
 (b) contacting said heated hot-melt adhesive composition to at least one rigid lineal substrate and at least one flexible wrap substrate;
 (c) cooling, or allowing to cool, said heated hot-melt adhesive composition; and
 (d) reacting said hot-melt adhesive composition with water or allowing it to react with water,
 wherein said hot-melt adhesive composition, after said step (d), is not a pressure-sensitive adhesive, and wherein said hot-melt adhesive composition does not include tackifying resin;
 wherein said amorphous non-reactive acrylic polymer has no hydroxyl, amine, or thio groups; and
 wherein said amorphous non-reactive acrylic polymer has carboxylic acid groups in the amount of greater than 0 to 70 micromole of carboxylic acid groups per gram of said amorphous non-reactive acrylic polymer.

2. A method for bonding substrates comprising the steps of
 (a) heating a moisture-reactive hot-melt adhesive composition formed by a process comprising admixing components comprising at least one polyol; at least one polyisocyanate; at least one amorphous non-reactive acrylic polymer having a weight-average molecular weight of 40,000 or greater; 0.5% or less by weight reactive acrylic polymer, based on the weight of said hot-melt adhesive composition; and 5% or less by weight thermoplastic ethylene copolymer resins, based on the weight of said hot-melt adhesive composition; wherein said amorphous non-reactive acrylic polymer has no hydroxyl groups;
 (b) contacting said heated hot-melt adhesive composition to at least one rigid lineal substrate and at least one flexible wrap substrate;
 (c) cooling, or allowing to cool, said heated hot-melt adhesive composition; and
 (d) reacting said hot-melt adhesive composition with water or allowing it to react with water;

wherein said lineal substrate is made of material selected from the group consisting of wood, wood composites, metals, and plastics;

wherein said hot-melt adhesive composition, after said step (d), is not a pressure-sensitive adhesive, and wherein said hot-melt adhesive composition does not include tackifying resin; wherein said amorphous non-reactive acrylic polymer has no hydroxyl, amine, or thio groups; and wherein said amorphous non-reactive acrylic polymer has carboxylic acid groups in the amount of greater than 0 to 70 micromole of carboxylic acid groups per gram of said amorphous non-reactive acrylic polymer.

3. The method of claim 2, wherein said polyol comprises at least one fatty polyol.

4. The method of claim 2, wherein said polyol comprises at least one fatty polyol, at least one polyester polyol, and at least one polyether polyol.

5. The method of claim 2, wherein said lineal substrate is selected from the group consisting of
   lineal substrates that have a cross section that includes at least one corner;
   lineal substrates that have a cross section that includes at least one face that is curved; and
   lineal substrates that have a cross section that includes at least one corner and at least one face that is curved; and
   wherein said step (b) comprises bending said flexible wrap to conform to the shape of said lineal substrate.

* * * * *